Aug. 31, 1937. W. OWEN 2,091,332
GLASS CUTTING APPARATUS
Filed June 23, 1936 3 Sheets-Sheet 3
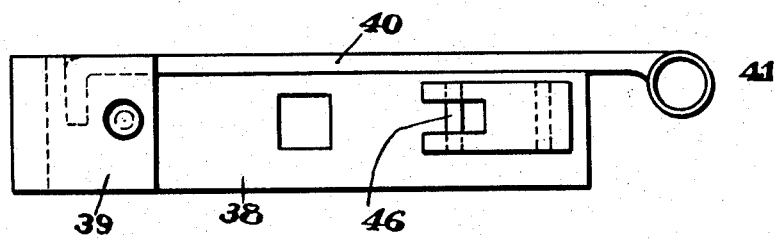
Fig. 6.
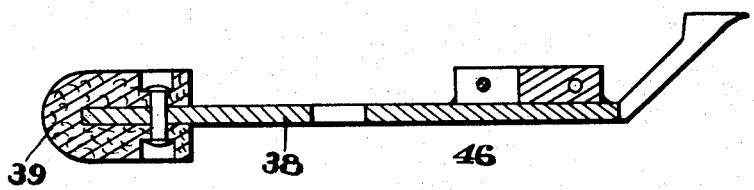
Fig. 7.
Fig. 8.
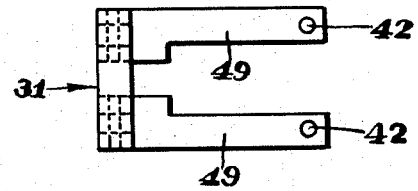
Fig. 9.
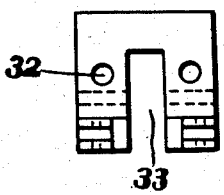
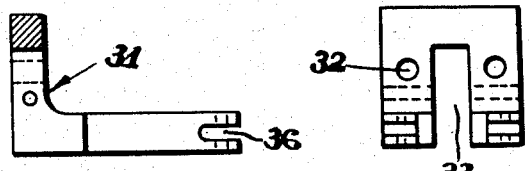
Fig. 8ᵃ
Fig. 8ᵇ
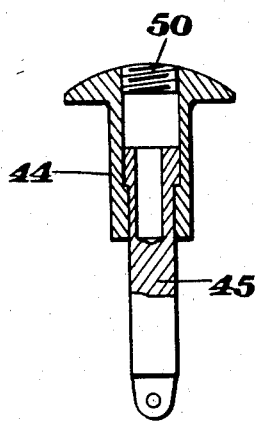
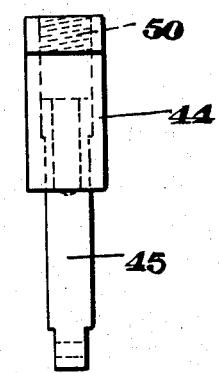
Fig. 9ᵃ    Fig. 9ᵇ
INVENTOR.
WILLIAM OWEN
BY Bradley+Bee
ATTORNEYS.

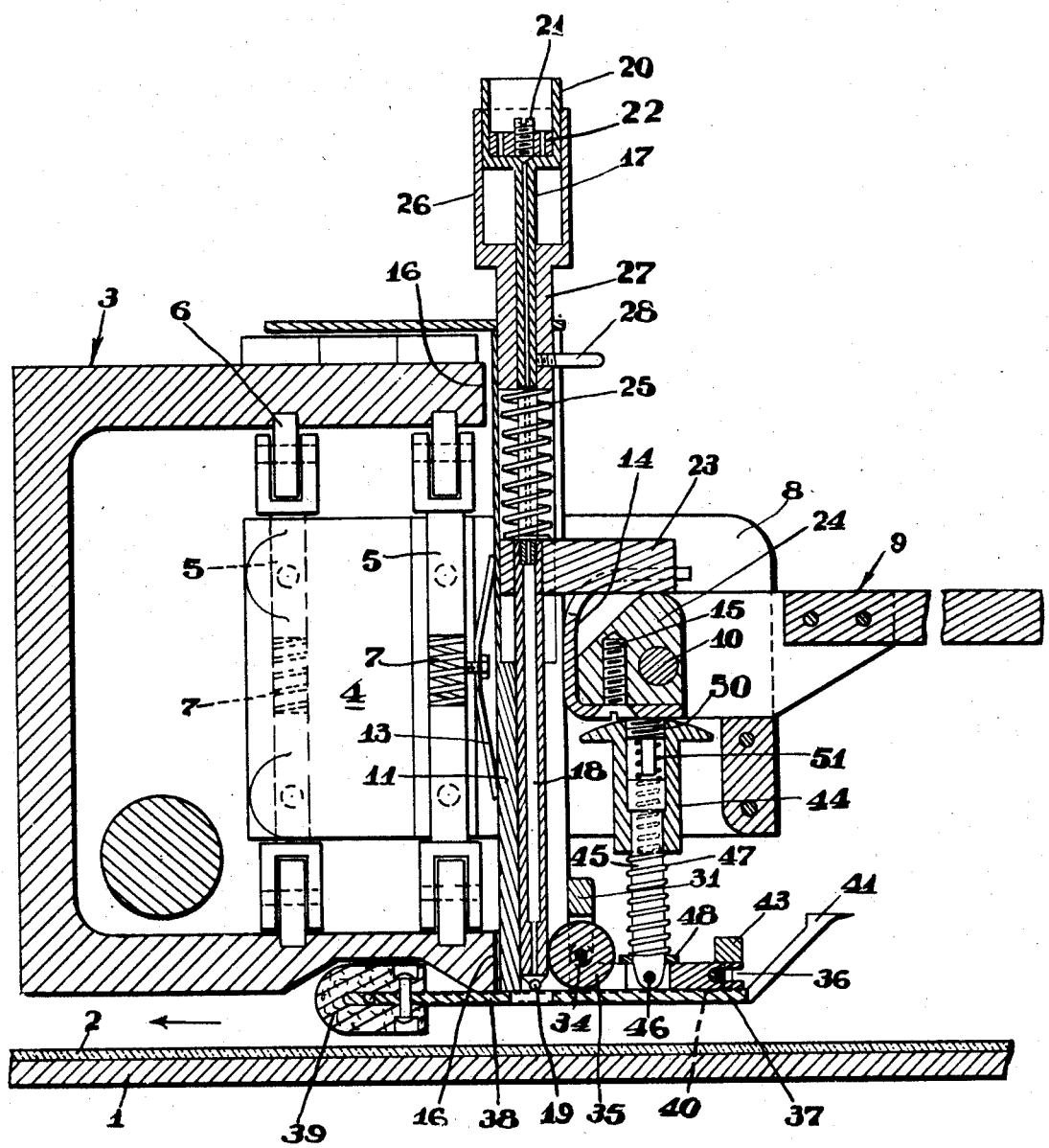

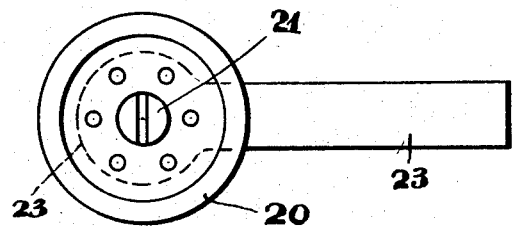
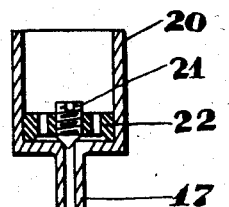
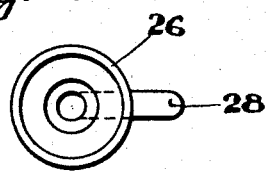
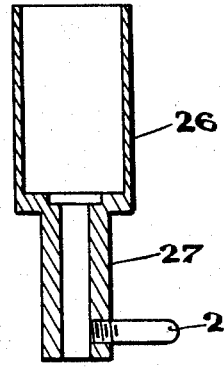
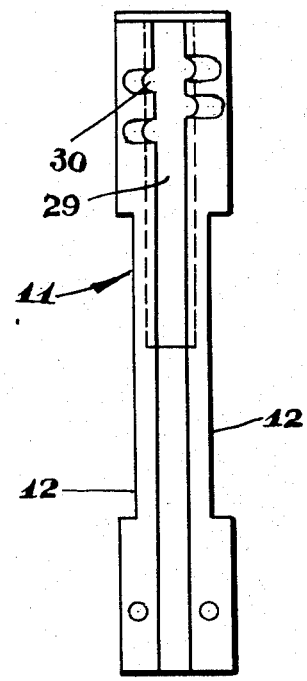
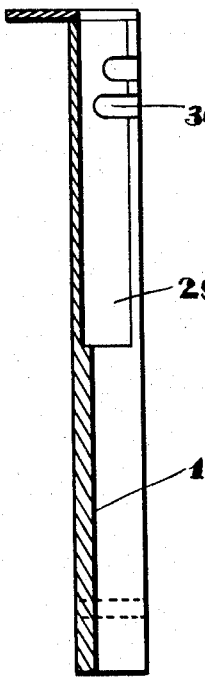

Patented Aug. 31, 1937

2,091,332

UNITED STATES PATENT OFFICE 2,091,332

GLASS CUTTING APPARATUS

William Owen, Pittsburgh, Pa., assignor to Pittsburgh Plate Glass Company, a corporation of Pennsylvania Application June 23, 1936, Serial No. 86,797

6 Claims. (Cl. 33—32)

The invention relates to glass cutting apparatus of the automatic type employing a movable bridge with a carriage thereon which supports the scoring tool or cutter and which is adjustable longitudinally of the bridge, and constitutes an improvement over the apparatus of my Patent No. 1,999,593, dated April 30, 1935. In the construction of the patent, no means are provided for wiping the glass sheet in advance of the cutter to remove chalk inspection marks and apply a cutting fluid (such as kerosene), and as a result, the life of the cutter and its effectiveness are reduced as compared with a hand cutting operation. The present invention has for its objects, the provision of means for improving the structure of the patent by the addition of a wiper for cleaning the glass and applying a cutting fluid thereto in advance of the cutter; the provision of a wiper which is moved up and down by the means which moves the cutter up and down, so that when the cut is completed and the cutter is moved up for the return movement of the carriage, the wiper is also moved up, thus preventing the wiper from being scraped over the edge of the glass sheet; and the provision of a construction of the character specified, in which yielding pressure is applied to the wiper independent of the yielding pressure applied to the cutter, so that the pressure of the cutter on the glass is unaffected by the presence of the wiper. One embodiment of the invention is illustrated in the accompanying drawings, wherein:

Figure 1 is a vertical section through the apparatus. Figs. 2 and 3 are detail views of the cutter spindle, Fig. 2 being a plan view and Fig. 3 a vertical section. Figs. 4 and 5 are detail views of the adjusting sleeve for the spindle spring, Fig. 4 being a plan view and Fig. 5 a vertical section. Figs. 6 and 7 are detail views of the wiper plate, Fig. 6 being a plan view and Fig. 7 a longitudinal section. Figs. 8, 8a and 8b are a series of detail views of the wiper plate supporting brackets, Figs. 9, 9a and 9b are a series of detail views of the wiper plate operating link. And Figs. 10 and 11 are detail views of the guide member in which the cutter spindle is mounted, Fig. 10 being a front elevation and Fig. 11 a vertical section.

Referring to the drawings, 1 is a table top for supporting the glass sheet 2 to be cut, and 3 is a cutter bridge which is mounted for movement over the table in the direction indicated by the arrow to perform the scoring or cutting function. Mounted for adjustment longitudinally of the bridge is a cutter head or carriage comprising a vertical plate 4 provided with sockets in which the four pins 5 are slidably mounted carrying at their ends the rollers 6 engaging grooves on the horizontal flanges of the cutter bridge, the opposing pins of each pair being pressed away from each other by the springs 7. The plate 4 has a pair of opposing flanges 8 projecting to the right of the bridge to provide a vertical slot in which the cam lever 9 is mounted on the pivot 10, the structure thus far described being a duplicate of the structure of my patent heretofore referred to.

Mounted in the head is the vertical cutter spindle guide having slots 12 at its sides into which the flanges 8 of the head fit holding the guide against vertical movement in the head when it is slid into the position shown in Fig. 1, the left side of the guide at this time engaging the leaf spring 13 secured to the plate 4 of the head. When the cam lever is in the position shown in Fig. 1 with its handle horizontal, the cutter head is free to be moved longitudinally of the bridge to any desired position. To hold the head in adjusted position, the lever is swung to vertical position, causing the spring 14 (which acts as a cam and is secured to the lever by the screw 15) to move the guide to the left against the tension of the spring 13 until the upper and lower ends of the guide engage the edges 16, 16 of the flanges of the bridge, thus locking the carriage to the bridge. This arrangement is also a duplicate of that of my patent heretofore referred to.

Mounted for vertical movement through the guide 11 is the cutter spindle (Figs. 2 and 3) consisting of two sections 17 and 18 secured together with a cutter 19 at the lower end of the part 18 and an oil cup 20 at the upper end of the part 17, a screw 21 serving to adjust the flow of oil through the plate 22 secured in the bottom of the cup. The upper end of the part 18 also has welded thereto the block 23 which is guided between the flanges 8 of the head and is adapted to be engaged by the cam 24 on the lever 9. The spindle is yieldingly pressed down by a spring 25 mounted in the guide 11 and engaging the top of the block 23. When the lever is in the position shown, the spindle is held by the cam 24 in its upper position with the cutter 19 out of contact with the glass. When the handle of the lever is swung to vertical position, the cam permits the block and spindle to move down under the pressure of the spring 25, so that the cutter engages the glass with yielding pressure. Means are provided to adjust the pressure of the spring 25 in the form of the sleeve 26 (Figs. 4 and 5), which fits around the spindle part 17 and cup 20, as indicated in Fig. 1, with the lower end 27 of the sleeve in engagement with the upper end of the spring 25. The end 27 is provided with a pin 28 which rides in the slot 29 of the guide 11 (Figs. 10 and 11), the edges of the slot being provided with the series of recesses 30. The sleeve 26 may thus be adjusted vertically in the guide 11 and locked in adjusted position by the engagement of the pin 28 with one of the recesses 30, the construction here again paralleling that of my patent.

At the lower end of the guide 11 is a bracket 31 secured thereto by screws passing through the holes 32 (Fig. 8) which bracket is slotted, as indicated at 33, and carries on a pin 34 a roller 35 which acts as a guide for the lower end of the spindle part 18. The end of the bracket is slotted, as indicated at 36, and carries a pivot pin 37. A wiper plate 38 (Figs. 6 and 7) is mounted for swinging up and down movement on the pin 37 and has at its ends the wiper 39 of felt or other suitable material. The plate has soldered to one side a conduit 40 leading to the container 41 which is supplied with kerosene or other suitable cutting fluid. The pair of vertical holes 42 (Fig. 8) receive a pair of pins carried by a block 43 (Fig. 1) which pins serve to lock the pin 37 in its slots.

The two-part link shown in Figs. 9, 9a and 9b is employed to operate the wiper plate in unison with the cutter spindle. This link comprises the sleeve 44 and the headed rod 45 slidable therein, giving a lost motion connection. The lower end of the rod 45 is connected to the wiper plate by means of the pin 46, and the sleeve 44 is yieldingly pressed upward by a spring 47 which rests on a washer 48. This washer rests on the legs 49, 49 (Figs. 8, 8a and 8b) of the bracket 31. The wiper plate is thus yieldingly held in raised or inoperative position when the cutter spindle is in upper position and the lever 9 is in the position illustrated. The upper end of the sleeve 44 is closed by a screw plug 50 and a spring 51 is interposed between this plug and the head of the rod 45.

When the lever 9 is swung from the position shown to a vertical position, the cam 24 moves the sleeve 44 downward compressing the spring 47, so that the rod 45 and the wiper plate 38 are free to move down, permitting the wiper to engage the glass. The spring 51 now regulates the pressure with which the wiper engages the glass.

From the foregoing, it will be seen that the cutter spindle and wiper plate are moved up and down together, but that the yielding forces applied to the cutter is regulated by the spring 25, while that applied to the wiper is regulated by the spring 51, so that the pressure exerted by the cutter is in no way affected by the presence of the wiper. Since the wiper is raised with the cutter for the return movement of the bridge after a cut is completed, the wiper is not subject to being carried over the sharp corner edge of the glass sheet.

What I claim is:

1. In combination in glass cutting apparatus, a table, a bridge mounted for movement over the table, a cutter head mounted for adjustment along the bridge, a vertical cutter spindle with a cutter at its lower end mounted for vertical movement through the head, a wiper plate mounted on the head for vertical swinging movement having a wiper in advance of the cutter, operating means common to the cutter spindle and wiper plate for securing their up and down movement at the same time, and spring means interposed between the operating means and the cutter spindle and between the operating means and the wiper plate to secure a yielding engagement of the cutter and the wiper with the glass.

2. In combination in glass cutting apparatus, a bridge mounted for movement over the table, a cutter head mounted for adjustment along the bridge, a vertical cutter spindle with a cutter at its lower end mounted for vertical movement through the head, a wiper plate mounted on the head for vertical swinging movement having a wiper in advance of the cutter, operating means common to the cutter spindle and wiper plate for securing their up and down movement at the same time, spring means interposed between the operating means and the cutter spindle and between the operating means and the wiper plate to secure a yielding engagement of the cutter and the wiper with the glass, and means whereby said spring means may be adjusted independently of each other.

3. In combination in glass cutting apparatus, a table, a bridge mounted for movement over the table, a cutter head mounted for adjustment along the bridge, a guide member mounted in the head, a vertical cutter spindle with a cutter at its lower end mounted for vertical movement in the guide member and yieldingly pressed down, a wiper plate pivotally supported on the guide member for up and down movement at the lower end thereof and provided with a wiper in advance of the cutter, spring means yieldingly holding the wiper plate in its upper position, and operating means for the cutter spindle and wiper plate comprising a lever on the cutter head provided with a cam which, when moved to one position, permits the cutter spindle to move down and swing the wiper plate downward, and which, when moved to another position, raises the cutter spindle and permits said spring means to swing the wiper plate upward.

4. In combination in glass cutting apparatus, a table, a bridge mounted for movement over the table, a cutter head mounted for adjustment along the bridge, a guide member mounted in the head, a vertical cutter spindle with a cutter at its lower end mounted for vertical movement in the guide member and yieldingly pressed down, a wiper plate pivotally supported on the guide member for up and down movement at the lower end thereof and provided with a wiper in advance of the cutter, spring means yieldingly holding the wiper plate in its upper position, a container for a cutting fluid mounted on the wiper plate with a conduit leading therefrom to the wiper, and operating means common to the cutter spindle and wiper plate for securing their downward movement at the same time and for securing their retraction at the same time.

5. In combination in glass cutting apparatus, a table, a bridge mounted for movement over the table, a cutter head mounted for adjustment along the bridge, a guide member mounted in the head, a vertical cutter spindle with a cutter at its lower end mounted for vertical movement in the guide member and yieldingly pressed down, a wiper plate pivotally supported on the guide member for up and down movement at the lower end thereof and provided with a wiper in advance of the cutter, spring means yieldingly holding the wiper plate in its upper position, yielding means for pushing the wiper plate downward, and operating means for the cutter spindle and wiper plate comprising a lever on the cutter head provided with a cam, which when moved to one position, permits the cutter spindle to move down and at the same time releases the wiper plate from said spring means and applies downward pressure to said yielding means causing the wiper plate to swing downward, and which when moved to another position raises the cutter spindle and permits said spring means to swing the wiper plate upward.

6. In combination in glass cutting apparatus, a table, a bridge mounted for movement over the table, a cutter head mounted for adjustment along the bridge, a guide member mounted in the head, a vertical cutter spindle with a cutter at its lower end mounted for vertical movement in the guide member and yieldingly pressed down, a wiper plate pivotally supported on the guide member for up and down movement at the lower end thereof and provided with a wiper in advance of the cutter, an operating link for the wiper plate consisting of an upright rod attached at its lower end to the plate and a sleeve having a lost motion connection with the upper end of the rod with a spring normally holding the sleeve from downward movement on the rod, a spring normally pressing the sleeve upward, so as to hold the plate in its upper position, and operating means for the cutter spindle and sleeve comprising a lever on the cutter head provided with a cam which, when moved to one position, permits the cutter spindle to move down and at the same time pushes the sleeve downward compressing said springs and swinging the wiper plate downward, and which, when moved to another position, raises the cutter spindle and permits the sleeve and rod to move upward raising the wiper plate.

WILLIAM OWEN.